United States Patent
Coronado et al.

(10) Patent No.: US 8,365,318 B2
(45) Date of Patent: Feb. 5, 2013

(54) FLEXIBLE FLANGE APPARATUS FOR CONNECTING CONDUITS AND METHODS FOR CONNECTING SAME

(75) Inventors: Eduardo Coronado, San Pedro Garza Garcia (MX); Jorge Sada, San Pedro Garza Garcia (MX)

(73) Assignee: Coflex S.A. DE C.V. (MX)

( * ) Notice: Subject to any disclaimer, the term of this patent is extended or adjusted under 35 U.S.C. 154(b) by 0 days.

(21) Appl. No.: 12/906,947

(22) Filed: Oct. 18, 2010

(65) Prior Publication Data

US 2011/0035867 A1 Feb. 17, 2011

Related U.S. Application Data

(63) Continuation of application No. 11/212,091, filed on Aug. 25, 2005, now Pat. No. 7,814,580, which is a continuation-in-part of application No. 10/370,747, filed on Feb. 20, 2003, now abandoned.

(51) Int. Cl.
*E03D 11/17* (2006.01)
(52) U.S. Cl. ........................................ 4/252.6
(58) Field of Classification Search ......... 4/251.1–252.6
See application file for complete search history.

(56) References Cited

U.S. PATENT DOCUMENTS

| | | | |
|---|---|---|---|
| 961,685 A | 6/1910 | Cosgrove | |
| 2,976,543 A * | 3/1961 | Turner et al. | 4/252.6 |
| 3,730,228 A | 5/1973 | Gibbs | |
| 3,821,820 A * | 7/1974 | Thompson | 4/252.6 |
| 3,860,978 A | 1/1975 | Wirth | |
| 3,873,137 A | 3/1975 | Yamaguchi | |
| 3,967,324 A | 7/1976 | Olive | |
| 3,967,836 A | 7/1976 | Izzi, Sr. | |
| 3,970,334 A | 7/1976 | Campbell | |
| 4,151,864 A | 5/1979 | Thurman | |
| 4,318,519 A | 3/1982 | Blevins | |
| 4,508,370 A | 4/1985 | Schroeder | |
| 4,799,713 A | 1/1989 | Uglow | |
| 5,018,224 A | 5/1991 | Hodges | |
| 5,063,616 A | 11/1991 | Bresnahan | |
| 5,143,122 A | 9/1992 | Adkins | |
| 5,291,619 A | 3/1994 | Adorjan | |
| 5,297,817 A | 3/1994 | Hodges | |
| 5,819,326 A | 10/1998 | Kobayashi et al. | |
| 6,052,839 A | 4/2000 | Teskey | |
| 6,152,186 A | 11/2000 | Arney et al. | |
| 6,327,717 B1 | 12/2001 | Johnson et al. | |
| 6,332,632 B1 | 12/2001 | Hodges | |
| 6,435,563 B2 | 8/2002 | Phillips | |
| 6,443,495 B1 | 9/2002 | Harmeling | |
| 6,519,784 B2 | 2/2003 | Carwile | |
| 6,719,294 B2 | 4/2004 | Nguyen | |
| 7,188,376 B2 * | 3/2007 | Ortiz et al. | 4/252.5 |
| 2009/0119826 A1 | 5/2009 | Coronado | |
| 2010/0037376 A1 | 2/2010 | Hughes | |

OTHER PUBLICATIONS

Wax-Free Bowl Gasket (7500, 7503, 7504)—Printed Aug. 25, 2005.

(Continued)

*Primary Examiner* — Huyen Le
(74) *Attorney, Agent, or Firm* — Baker & McKenzie LLP

(57) ABSTRACT

The present disclosure generally relates to improved water closet flanges and methods for installing such water closet flanges. In one exemplary embodiment, an improved water closet flange apparatus includes an outer flange and a flexible conduit portion (i.e. sleeve) extending downwardly therefrom. The flexible sleeve has a sufficient degree of flexibility to accommodate connection between offset, misaligned, angled, or otherwise incongruous plumbing fixture discharges and waste drain pipe outlets. In one embodiment, the flexible sleeve includes at least one corrugated portion to aid the desired flexibility. An upper portion of the flexible sleeve may include an inwardly extending lip portion to accommodate the desired seal between the plumbing fixture discharge and the flange apparatus. Related methods for installing the disclosed flange apparatus between plumbing fixture discharges and waste drainpipes are also described.

19 Claims, 7 Drawing Sheets

OTHER PUBLICATIONS

FluidMaster 7500 Wax-Free Toilet Bowl Gasket Kit Installation Instructions—Printed Aug. 25, 2005.

PCT/IB2012/000803, International Search Report and Written Opinion of the International Searching Authority mailed Oct. 16, 2012.

* cited by examiner

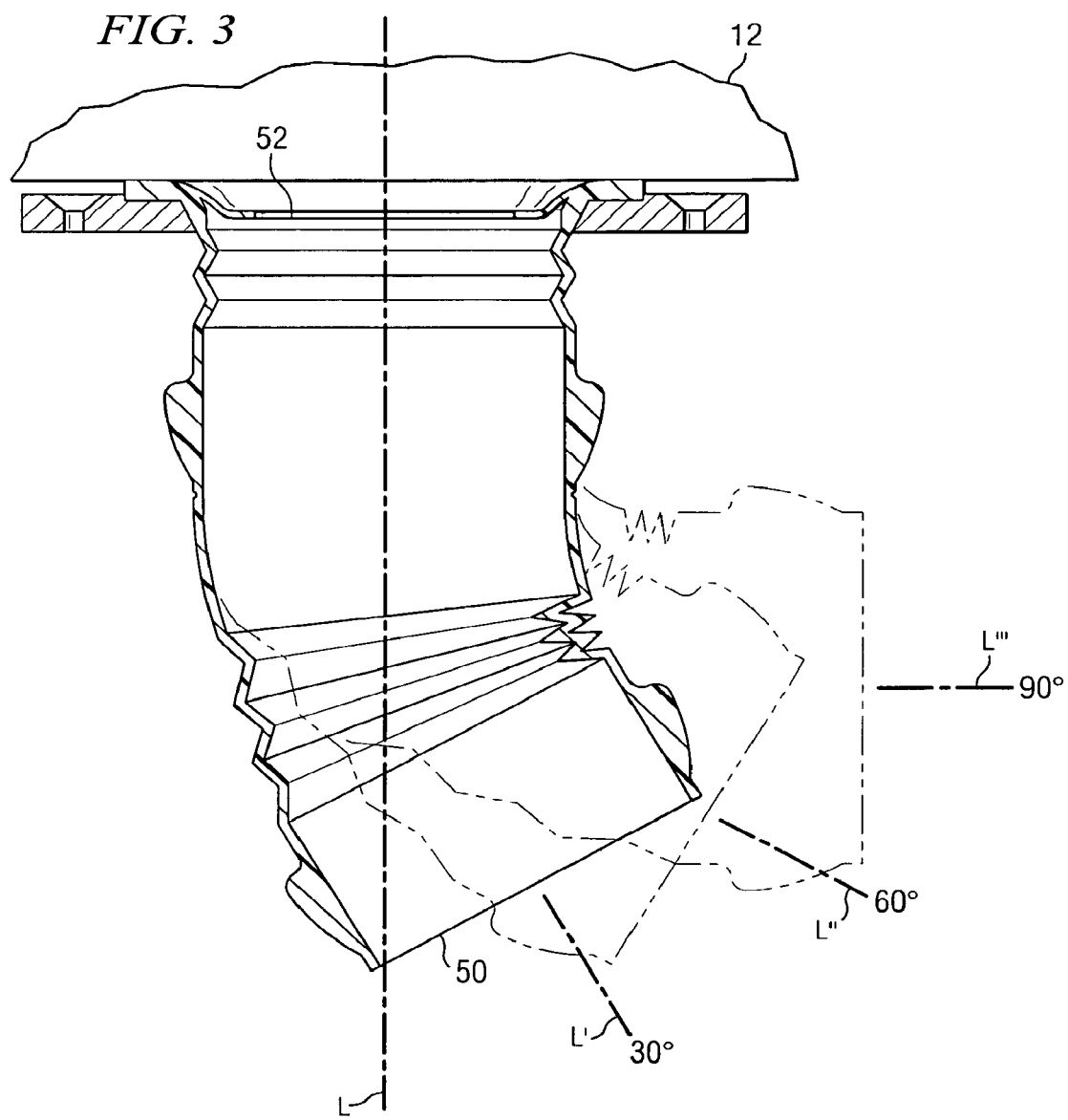

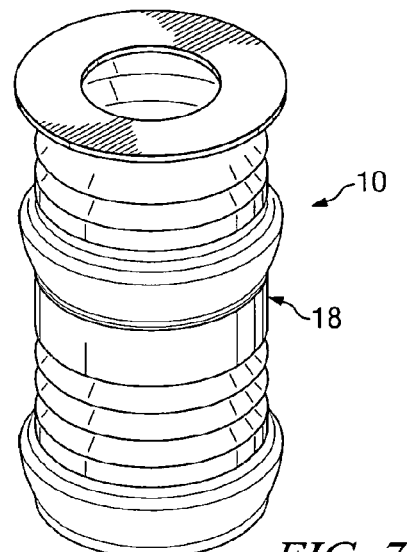
*FIG. 7A*
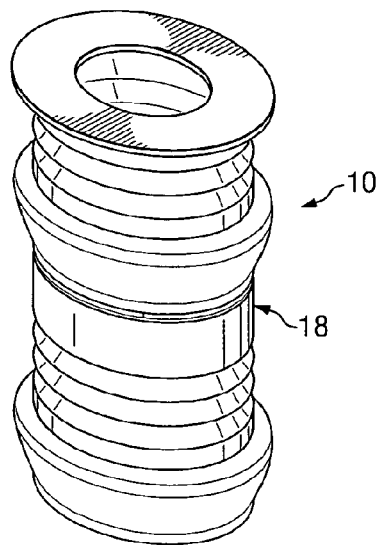
*FIG. 7B*
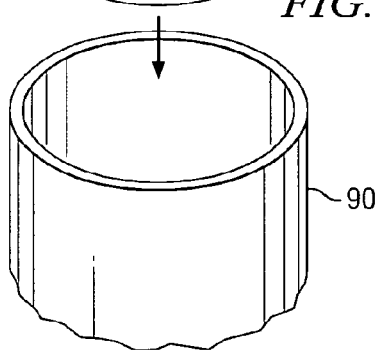
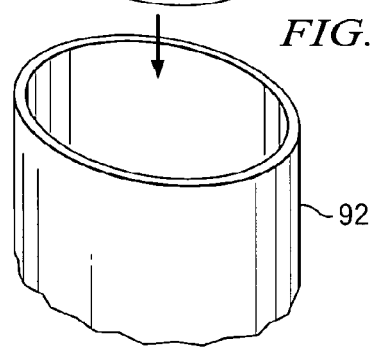
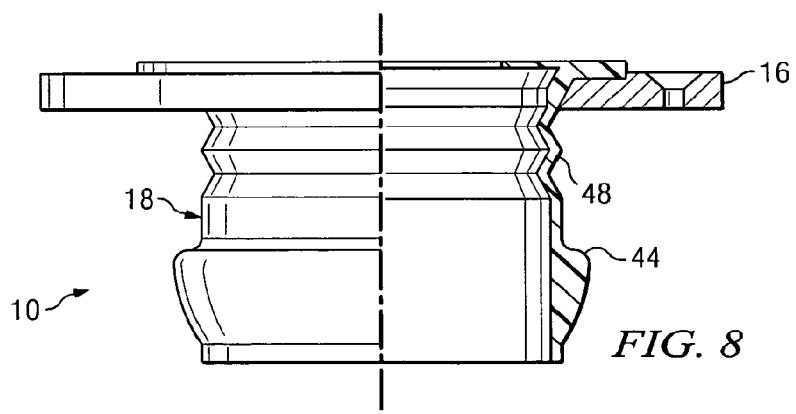
*FIG. 8*

FLEXIBLE FLANGE APPARATUS FOR CONNECTING CONDUITS AND METHODS FOR CONNECTING SAME

CROSS-REFERENCE TO RELATED APPLICATIONS

The present application is a continuation application of the co-pending U.S. patent application Ser. No. 11/212,091, filed Aug. 25, 2005 now U.S. Pat. No. 7,814,580, entitled "Flexible Flange Apparatus for Connecting Conduits and Methods for Connecting the Same," which is a continuation-in-part of application of U.S. patent application Ser. No. 10/370,747, filed Feb. 20, 2003 now abandoned, entitled "Improved Flexible Sleeve for Connection to a Plumbing Fixture," both of which are incorporated herein by reference in their entirety.

TECHNICAL FIELD

The present disclosure relates generally to devices for connecting conduits, such as plumbing fixtures to waste drain conduits, and more particularly to a flange apparatus, including a specially configured flexible sleeve and a closet flange, which mounts a water closet (toilet) on a supporting floor surface and also provides a sealed interconnection between a water closet (toilet) and a water waste drain pipe. Related methods for interconnecting conduits are also described.

BACKGROUND

Water closets, also called toilets, are waste disposal devices commonly installed in most bathrooms. These kinds of plumbing appliances generally include a water-storing receptacle called a water tank that is attached to a siphon seat-shaped bowl called toilet bowl. Periodically, waste is removed from the toilet bowl by flushing, thereby allowing water to drain from the water tank through the toilet bowl and into a waste drainpipe. In order to work, however, the toilet bowl must be connected to the waste drainpipe by fluid carrying conduits. Typically, the toilet bowl will sit flat on a floor and connect with a rigid water closet flange. The water closet flange in turn connects with conduits leading to a waste drainpipe.

Conventional water closet flanges are typically designed to interconnect between conduits lying on a common longitudinal axis. Accordingly, such water closet flanges are formed to be rigid and generally do not provide any kind of flexibility along their conduit portion and are therefore insufficient for allowing any non-negligible distortion of the flange. Such flexibility may be desirable in situations where the waste drain pipe has suffered deformation caused by stress or external forces applied by the materials surrounding the pipe (e.g. concrete, cement, etc.). These stresses may result in the opening of the pipe taking an oval shape, which in turn, would prevent prior art rigid flanges from entering the pipe, thus requiring the use of a wax seal applied directly to the pipe opening.

Moreover, flexible flanges may be desirable when connecting between discharge pipes and waste drain outlets having offset, misaligned, angled, or otherwise incongruous configurations. Use of rigid flanges in such situations would necessitate the use of wax seal applied directly to the pipe opening.

Still further, it has been found that dimensions of drainpipes often vary depending on the manufacturer. This situation is common in jurisdictions where such dimensions are not regulated and manufacturers minimize cost by manufacturing drainpipes to be thinner and/or smaller than needed.

As can be appreciated, the aforementioned problems are typically more prevalent in those jurisdictions lacking proper regulations, and having varying construction methods and materials. As explained above, because of the rigidity of the conduit portions of the closet flanges that are currently available, there are several problems related with oval shaped pipes, incongruous pipes and under or over sized pipes. Most professionals who deal with these kinds of problems turn to the use of wax seals and/or modification of the waste drainpipe. However, these solutions are not reliable because the seal connection is not strong enough to prevent leakage and associated odors, and oftentimes they can be expensive and inefficient due to delays in the installation process.

Also, conventional closet flanges are made for either cast iron piping, or for plastic piping, but not both, typically due to metal piping having a smaller internal diameter than the ones made from plastic.

Improved water closet flanges for addressing the above-described problems are desired. Related methods for installing improved water closet flanges are also desired.

BRIEF SUMMARY

The present disclosure generally relates to improved water closet flanges and methods for installing such water closet flanges. In one exemplary embodiment, an improved water closet flange apparatus includes an outer flange and a flexible conduit portion (i.e. sleeve) extending downwardly therefrom. The flexible sleeve has a sufficient degree of flexibility to accommodate connection between offset, misaligned, angled, or otherwise incongruous plumbing fixture discharges and waste drainpipe outlets. In one embodiment, the flexible sleeve includes at least one corrugated portion to aid the desired flexibility while preventing kinking of the flexible sleeve. An upper portion of the flexible sleeve may include an inwardly extending lip portion to accommodate the desired seal between the plumbing fixture discharge and the flange apparatus, thereby eliminating the need for a separate gasket element, such as a wax seal or rubber foam seal. Also, the improved water closet flange connects plumbing fixture discharges and waste drainpipes without any flow reduction between such elements.

Related methods for installing the disclosed flange apparatus between plumbing fixture discharges and waste drainpipes are also described.

BRIEF DESCRIPTION OF THE DRAWINGS

Reference is now made to the following descriptions taken in conjunction with the accompanying drawings.

FIG. 3 illustrates an elevational sectional view of exemplary distortion angles of the flange apparatus of FIG. 1;

FIG. 7A illustrates an isometric view of the flange apparatus; for disposal within a waste drainpipe having a substantially circular cross section.

FIG. 7B illustrates an isometric view of the flange apparatus for disposal within a waste drainpipe and having a substantially oval cross section.

FIG. 8 illustrates partial sectional, partial elevational view of another embodiment of a flexible flange apparatus according to the present disclosure.

DETAILED DESCRIPTION

Various aspects of a flexible flange apparatus and related methods for installing a flexible flange apparatus according to the present disclosure are described. It is to be understood, however, that the following explanation is merely exemplary in describing the devices and methods of the present disclosure. Accordingly, several modifications, changes and substitutions are contemplated.

Figure 1:
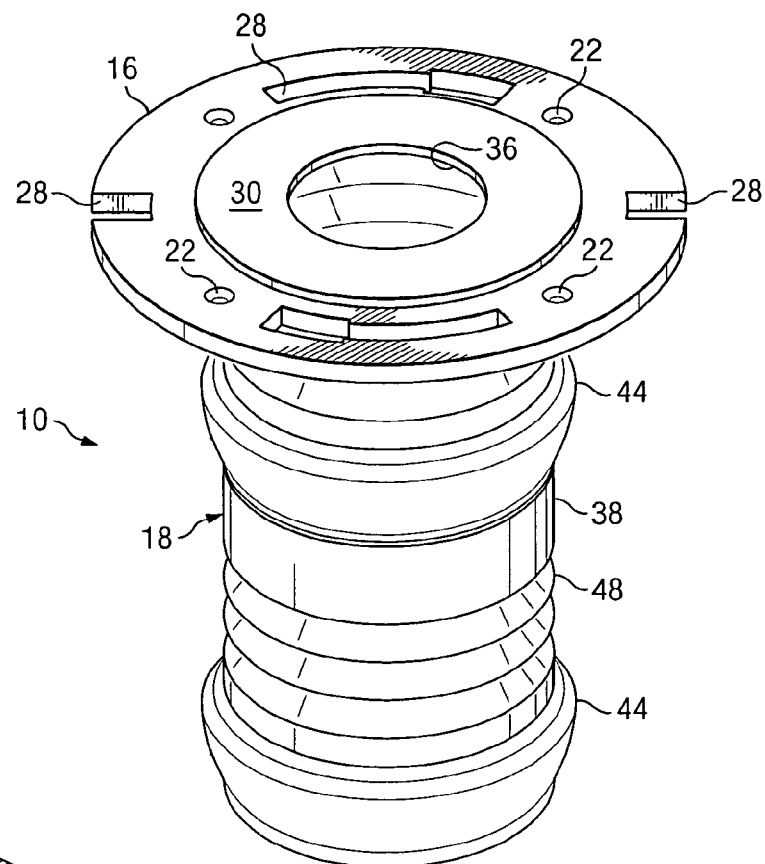
FIG. 1 illustrates an isometric view of one embodiment of a flexible flange apparatus according to the present disclosure.
Figure 2A:
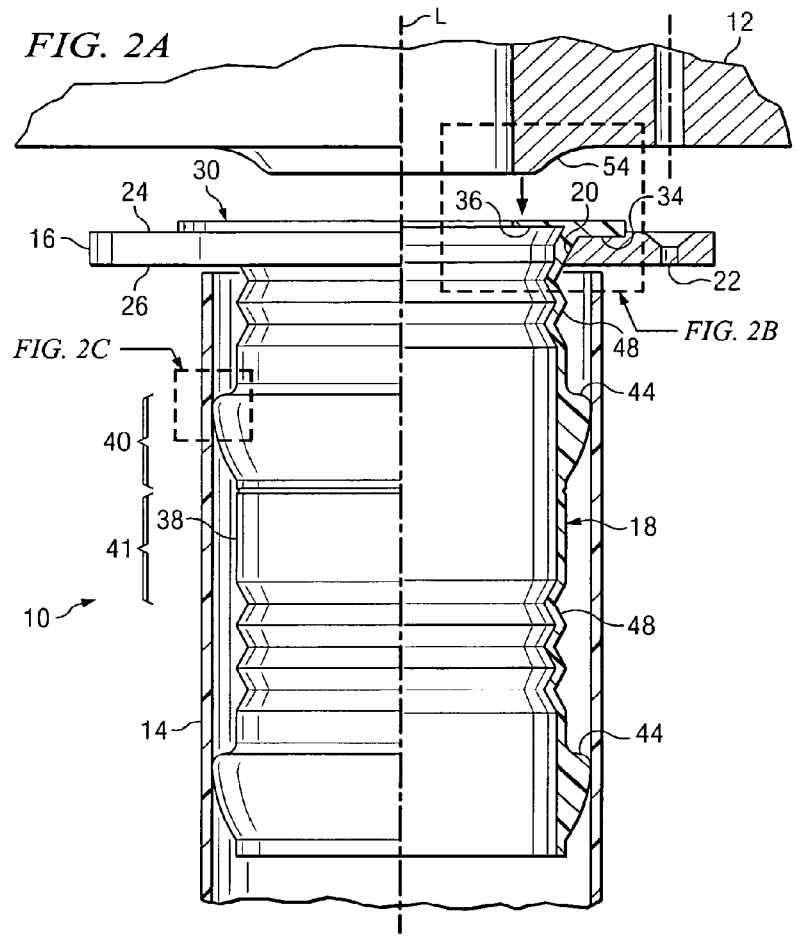
FIG. 2A illustrates a partial sectional, partial elevational view of the flange apparatus of FIG. 1 in its operative position between an exemplary plumbing discharge outlet and an exemplary waste drainpipe.

FIGS. 1 and 2A illustrate a flexible flange apparatus 10 for connecting between a plumbing fixture discharge 12 and a waste drainpipe outlet 14. The flange apparatus includes an outer flange 16 and a sleeve 18 disposed through an aperture 20 of the outer flange. In some embodiments, the sleeve 18 is integrally formed with the outer flange 16 as a single piece, while in other embodiments, the sleeve is removably seated on the outer flange. The outer flange 16 may include one or more apertures 22 formed through the outer flange from an upper surface 24 to a lower surface 26 of the outer flange. The apertures 22 may receive fasteners (not shown) for securing the flange apparatus 10 to a surface, such as a floor disposed between a plumbing fixture discharge and a waste drainpipe outlet. The outer flange 16 may include additional apertures 28 formed therethrough for facilitating connection of the outer flange to a plumbing fixture discharge. The apertures 28 may take any suitable shape and size to accommodate varying plumbing fixture discharges.

The sleeve 18 includes an upper portion 30, which is seated in a radial groove 34 defined in the upper surface 24 of the outer flange 16. In some embodiments, the outer flange 16 includes a uniform upper surface 24 with no radial grooves and the upper portion 30 of the sleeve is seated on the substantially planar upper surface 24 of the outer flange. The upper portion 30 of the sleeve 18 includes an inwardly-extending radial lip 36, which is sufficiently flexible to deflect downwardly relative to the upper surface 24 of the outer flange 16 for reasons to be described.

The sleeve 18 further includes a lower portion 38 generally defined as the portion of the sleeve extending below the upper surface 24 of the outer flange 16. In one embodiment, the sleeve 18 is made of substantially uniform material, and thus, the lower portion 38 is sufficiently flexible to permit distortion of the lower portion to achieve non-negligible angles of deflection relative to a non-distorted longitudinal axis thereof. In one example, a non-negligible angle of deflection may be ten degrees or more of deflection of one end of the sleeve 18 relative to an opposing end of the sleeve. The sleeve 18 may be formed of various materials to permit non-negligible flexibility. For example, the sleeve 18 may be formed of materials having a hardness ranging from 35 shore A to 90 shore A, or from 35 shore A to 65 shore A, or more specifically about 50 shore A. As can be appreciated, the uniform nature of the sleeve 18 leads to a reduction in manufacturing costs and the likelihood of error during installation. Also, the sleeve 18 may be of any suitable length. In one example, the sleeve 18 is 7-8 inches in length.

The sleeve 18 further includes one or more sealing elements 44 extending annularly about the sleeve. In some embodiments, the sealing elements 44 form a portion of the sleeve 18, and therefore, constitute a region of increased diameter relative to other regions of the sleeve. For example, referring to FIG. 2A, the sealing element 44 generally corresponds to region 40, which is larger in diameter relative to region 41 of the sleeve 18. As illustrated, the sealing element 44 has a maximum diameter at its upper longitudinal end and generally decreases in diameter to its lower longitudinal end adjacent to the beginning of region 41. In this manner, the sealing element 44 provides a tight water seal with a larger longitudinal coverage than other sealing structures. It is contemplated that the sealing elements 44 may take other shapes so long as they seal the interface between the sleeve 18 and a waste drainpipe. For example, the sealing elements 44 may be modified to have a substantially uniform diameter, an increasing diameter from the lower longitudinal end to the upper longitudinal end of the sealing elements, or a varying diameter between longitudinal ends of the sealing elements.

Figure 2B:
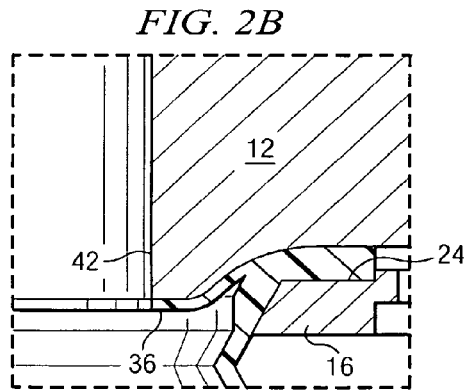
FIG. 2B illustrates a detailed sectional view of the plumbing fixture discharge seated against the flexible flange apparatus.

Referring to FIG. 2A, the flange apparatus 10 is shown disposed between the plumbing fixture discharge 12 and the waste drainpipe 14 lying on a common longitudinal axis L. For purposes of this specification, a plumbing fixture discharge and a waste drainpipe lying on a common longitudinal axis are defined to be congruous. Accordingly, a plumbing fixture discharge and a waste drainpipe not lying on a common longitudinal axis are defined to be incongruous. The plumbing fixture discharge 12 may be seated against the sleeve 18 such that an extended portion 42 of the plumbing discharge comes into contact with inwardly-extending lip 36, thereby deflecting the lip downwardly relative to the upper surface 24 of the outer flange 16. As shown in FIG. 2B, the inward lip 36 may deflect downwardly beyond the upper surface 24 of the outer flange 16 when in contact with the plumbing discharge 12. The lip 36 provides a tight seal that will prevent gas and fluids from leaking from the interconnection between the plumbing discharge 12 and the drainpipe 14 and the seal is sufficient to not break even if the toilet becomes backed up. Moreover, the sealing protection provided by the lip 36 eliminates the need for separate additional elements, such as regular wax seals or foam rubber gaskets.

Figure 2C:
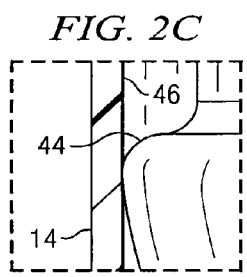
FIG. 2C illustrates a detailed elevational view of a sealing apparatus of the flexible flange apparatus disposed against the waste drainpipe.

Referring to FIG. 2C, one of the sealing elements 44 of the sleeve 18 is shown disposed against an inner wall 46 of the waste drainpipe 14. As discussed above, the sealing element 44 provides a tight seal between the sleeve 18 and the drainpipe 14, thereby preventing fluid and gases from traveling back up the sides of the sleeve when installed.

Referring again to FIG. 2A, the lower portion 38 may include one or more corrugated portions 48, which aid flexibility of the sleeve 18 while preventing kinking during flexing. As can be appreciated, the corrugated portions 48 along with the inherent flexibility of the sleeve 18 itself provides an increased degree of flexibility relative to conventional pipes that are designed for discharge pipes and waste drainpipes lying on a common longitudinal axis. Indeed, the flexible sleeve 18 with corrugated portions 48 facilitates distortion of the sleeve to achieve varying degrees of deflection of the sleeve relative to a longitudinal axis L of the sleeve when in a non-distorted position. For example, referring to FIG. 3, the flexible sleeve 18 with corrugated portions 48 may be distorted to achieve 30 degrees, 60 degrees and 90 degrees of deflection defined by the angular displacement of longitudinal axes L', L'' and L''', respectively, relative to the non-distorted longitudinal axis L. In this example, the longitudinal axes L', L'' and L''' refer to the longitudinal axis of a distal end 50 of the sleeve, whereas the longitudinal axis L is the axis of a proximal end 52 of the flexible sleeve. Moreover, the illustration of 30, 60 and 90 degrees merely exemplifies various deflection angles and it is to be understood that the sleeve 18 may be distorted to achieve any angle of deflection between 0 and 90 degrees, and even angles beyond 90 degrees. Still further, the resultant deflection angle between the ends 50, 52 of the sleeve 18 may be 0 degrees, yet the sleeve may be distorted along a midsection to accommodate installation between offset plumbing discharges and drainpipes.

In some embodiments, the entire sleeve 18 (including the upper 30 and lower 38 portions) may be formed of material having a greater degree of hardness relative to the previously described embodiments. For example, the hardness of the sleeve 18 may range up to a relatively rigid 120 Rockwell R. In embodiments where the sleeve 18 is formed of relatively rigid materials, the sleeve 18 may include any number of corrugated portions 48 to impart the desired flexibility to the sleeve. In these embodiments, an additional soft sealing element, such as an O-ring, may be added around the lower portion 38 and a wax seal or soft plastic material may be added adjacent to the lip 36. In still other embodiments, the upper portion 30 of the sleeve 18 may be formed of a flexible material while the lower portion 38 is formed of a relatively rigid material. In this example, the lower portion 38 maintains flexibility via the corrugated portions 48.

Figure 4:
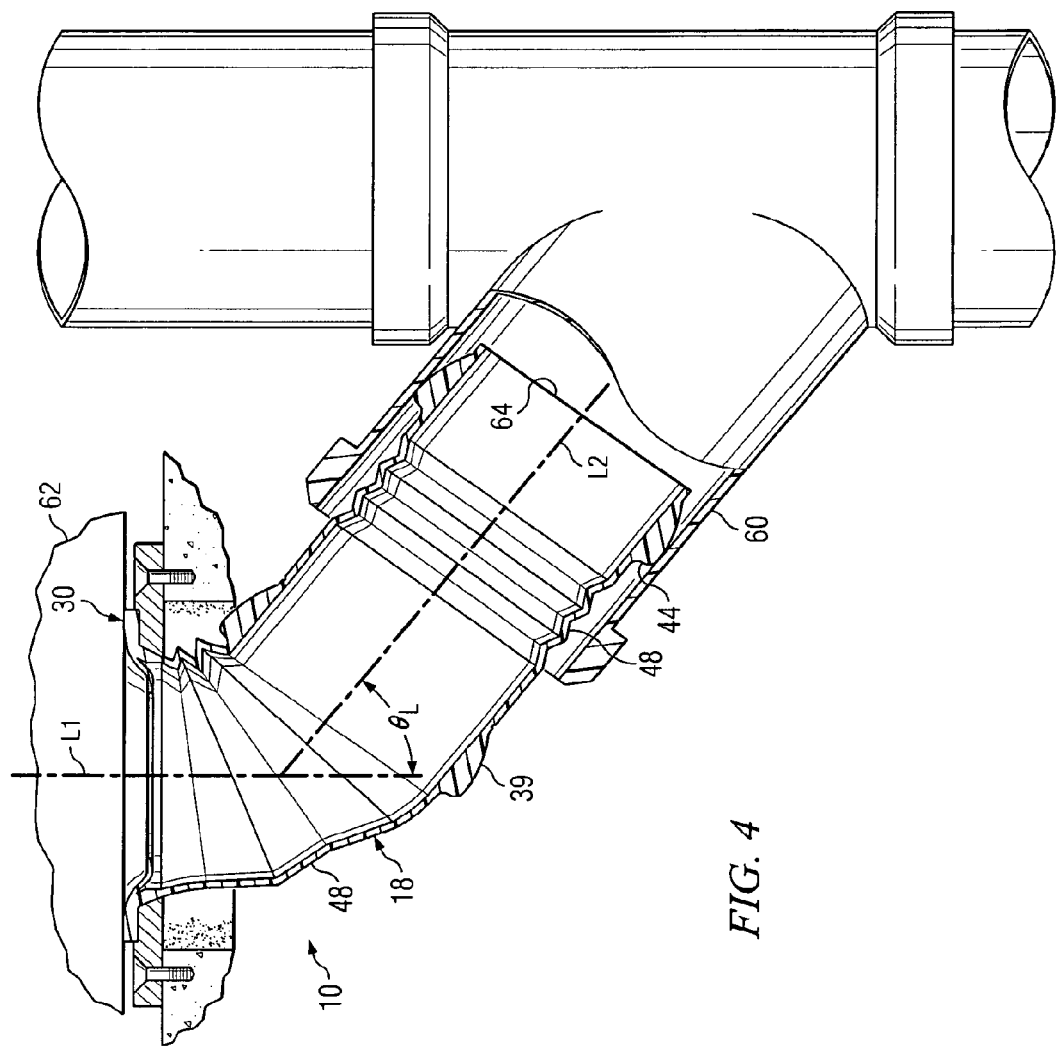
FIG. 4 illustrates an elevational sectional view of the flange apparatus installed in a diagonally oriented waste drainpipe.

In practice, the flange apparatus 10 is used to connect a plumbing fixture discharge, such as the distal portion of a toilet, to a waste drainpipe, such as a sewage line. In facilitating this connection, the flange apparatus 10 provides a tight seal and reliable connection to prevent any undue leakage or other undesirable consequence of the connection. During installation, the flange apparatus 10 may be seated against a surface disposed between a plumbing fixture discharge and a waste drainpipe, such as a floor surface. The sleeve 18 is flexible enough to permit installation between offset, misaligned, angled, or otherwise incongruous plumbing fixture discharges and waste drainpipe outlets. Referring to FIG. 4, the outer flange 14 is seated against a floor surface 50 and the sleeve 18 is shown installed in a waste drainpipe 60 oriented diagonally relative to the upper portion 30 of the sleeve and a plumbing discharge 62. In particular, the plumbing discharge 62 and the upper portion 30 of the sleeve 18 lie on a common longitudinal axis L1, whereas the waste drainpipe 60 and a lower end 64 of the sleeve 18 lie on a common longitudinal axis L2. The angular displacement between the longitudinal axes L1 and L2 is defined by $\theta_L$. The corrugated portion or portions 48 of the sleeve 18 facilitates distortion of the sleeve to achieve the desired angular displacement or deflection. Indeed, the installer may manually achieve the desired deflection (e.g., by bending the sleeve), thereby eliminating the need for additional equipment or materials for installation.

Figure 5:
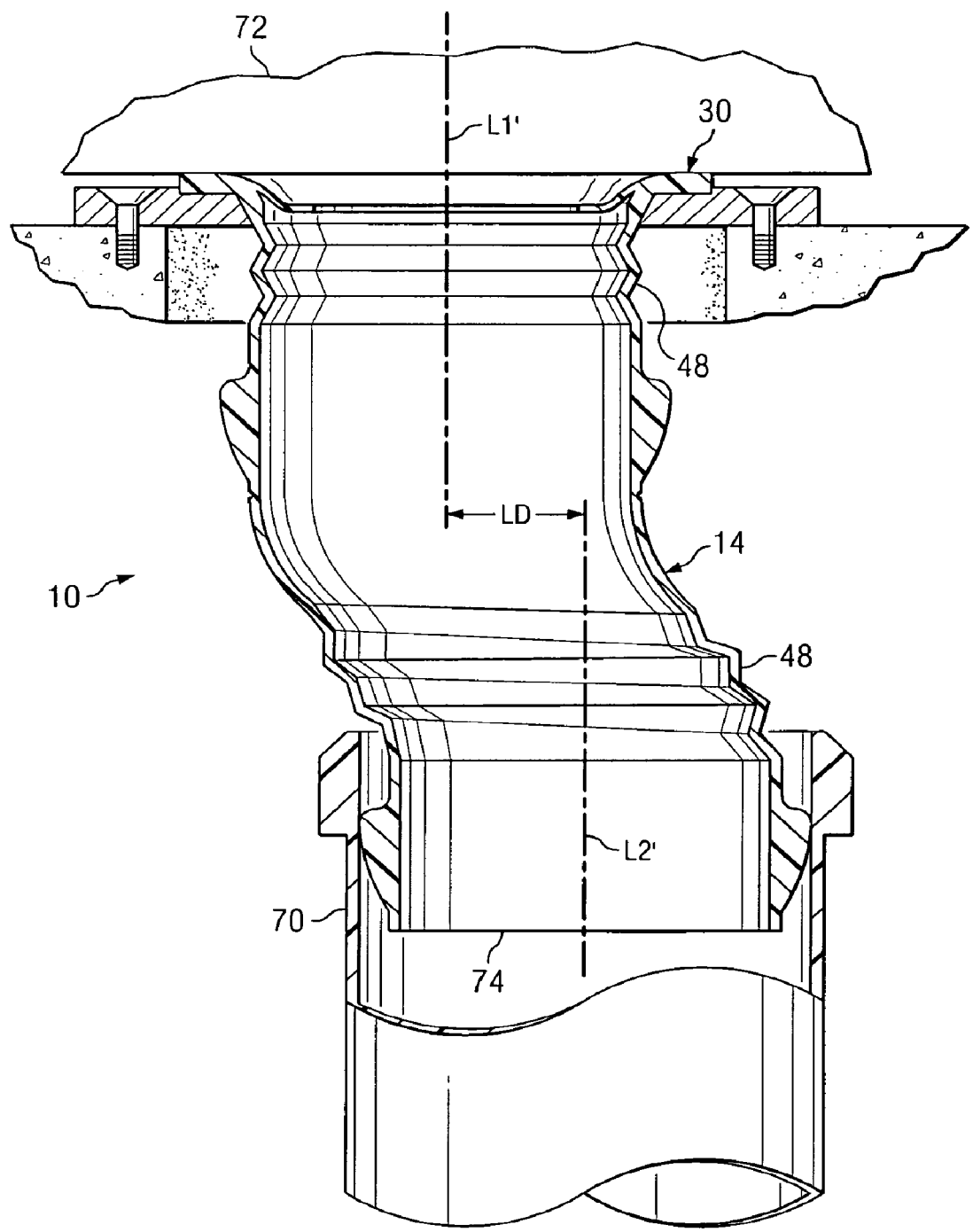
FIG. 5 illustrates an elevational sectional view of the flange apparatus installed in a horizontally offset waste drainpipe.

Referring to FIG. 5, the sleeve 18 is shown installed in a waste drainpipe 70 oriented in an offset manner relative to the upper portion 30 and a plumbing discharge 72. In particular, the plumbing discharge 72 and the upper portion 30 of the sleeve 18 lie on a common longitudinal axis L1', whereas the waste drainpipe 70 and a lower end 74 of the sleeve 18 lie on a common longitudinal axis L2'. The angular displacement between the longitudinal axes L1' and L2' is 0 degrees, yet the longitudinal axes are linearly displaced by a distance LD. The corrugated portion or portions 48 of the sleeve 18 facilitates distortion of the sleeve to achieve the desired linear displacement. Indeed, the installer may manually achieve the desired deflection (e.g., by bending the sleeve), thereby eliminating the need for additional equipment or materials for installation.

Figure 6:
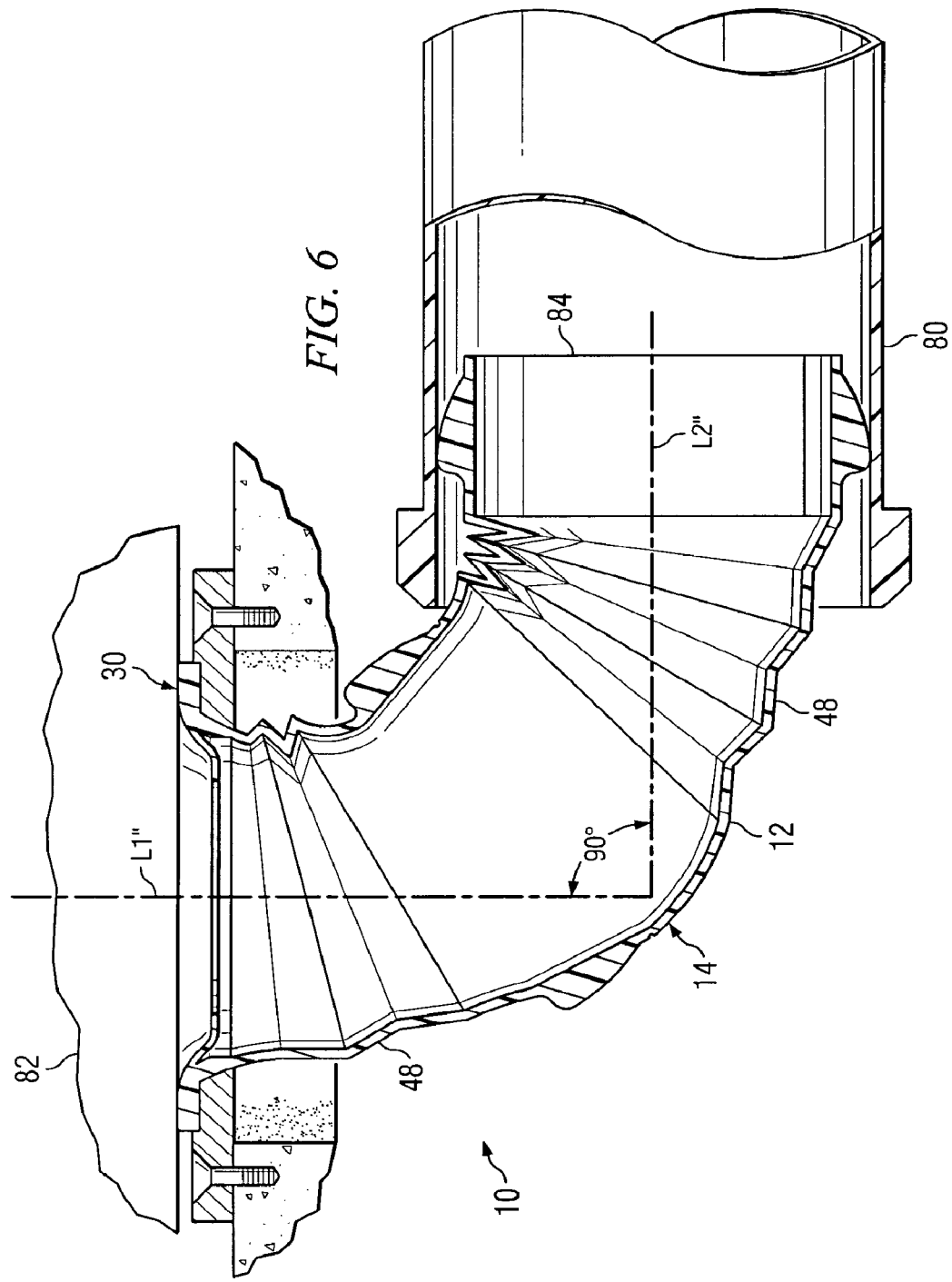
FIG. 6 illustrates an elevational sectional view of the flange apparatus installed in a horizontally oriented waste drainpipe.

Referring to FIG. 6, the sleeve 18 is shown installed in a waste drainpipe 80 oriented in a substantially orthogonal manner relative to the upper portion 30 and a plumbing discharge 82. In particular, the plumbing discharge 82 and the upper portion 30 of the sleeve 18 lie on a common longitudinal axis L1'', whereas the waste drainpipe 80 and a lower end 84 of the sleeve 14 lie on a common longitudinal axis L2''. The angular displacement between the longitudinal axes L1'' and L2'' is 90 degrees. The corrugated portion or portions 48 of the sleeve 18 facilitates distortion of the sleeve to achieve the desired angular displacement. Indeed, the installer may manually achieve the desired deflection (e.g., by bending the sleeve), thereby eliminating the need for additional equipment or materials for installation.

It is to be appreciated that the flexible flange apparatus 10 has additional benefits, such as the ability to deform to fit oval-shaped or undersized pipes. Referring to FIG. 7A, in one embodiment, the sleeve 18 has a substantially circular cross section when not subjected to external forces. Such a configuration is desirable to accommodate connection to a circular-shaped waste drainpipe 90. Referring to FIG. 7B, the flexibility of the sleeve 18 permits deformation of the sleeve such that the sleeve may be deformed to have a substantially oval cross section, thereby accommodating connection to an oval-shaped waste drainpipe 92. The sleeve 18 may be deformed to fit a variety of non-circular pipes other than oval-shaped pipes. As can be appreciated, the sleeve 18 may accommodate connection to a variety of drainpipes of non-standardized schedules and to plastic or cast-iron drainpipes. Also, the sleeve 18 may accommodate connection to waste drainpipes having varying sizes. For example, the sleeve 18 can be implemented in waste drainpipes having 3 inch (7.5 cm) and 4 inch (10 cm) diameters because of the flexibility of the sleeve. Alternatively, the flexible sleeve 18 can be implemented into either 3 inch or 4 inch drainpipes when utilizing an appropriately-sized seal, such as the seal 44.

Figure 9:
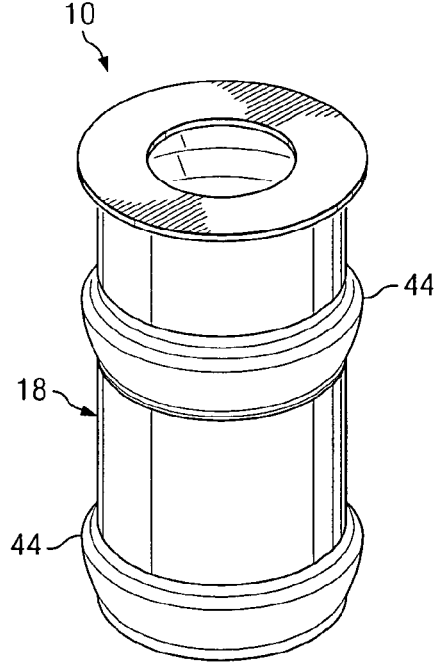
FIG. 9 illustrates an isometric view of yet another embodiment of a flexible flange apparatus according to the present disclosure.

While various embodiments of a flexible flange apparatus and related methods of installing the flexible flange apparatus between congruous and incongruous plumbing discharges and waste drainpipes have been described above, it should be understood that they have been presented by way of example only, and not limitation. For example, referring to FIG. 8, the flexible flange apparatus 10 may be modified to be shorter in length than the flexible flange apparatus illustrated in FIGS. 1-7. In one embodiment, the short embodiment of the flexible flange apparatus 10 may comprise an outer flange 16 and a sleeve 18 substantially similar to the outer flange and sleeve of FIGS. 1-8, except that the sleeve 18 comprises a single corrugated portion 48 and sealing element 44. Such configuration may be desirable when connecting between a plumbing discharge outlet and a waste drainpipe positioned substantially adjacent to one another. In some embodiments, the short version of the flexible flange apparatus 10 may be 2-3 inches in length. Still further, referring to FIG. 9, the sleeve 14 may have no corrugated portions, yet still have sufficient flexibility to deflect at a wide variety of angles relative to the non-distorted longitudinal axis L, including angles between 0 and 90 degrees, and even angles beyond 90 degrees. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for manufacturing a flange apparatus for connecting between a plumbing fixture discharge and waste drainpipe outlet, comprising:
   providing an outer flange for seating against a surface disposed substantially between the plumbing fixture discharge and the waste drainpipe outlet; and
   providing a sleeve operable to be coupled to the outer flange, the sleeve being unitarily formed of a flexible material and having one or more corrugated portions along a lower portion of the sleeve such that the sleeve is capable of at least ten degrees of deflection while maintaining a cross-sectional shape of a lower portion of the sleeve, the sleeve further comprising:
      an inward lip extending from an outer, top surface of an upper portion, the lip being sufficiently flexible to deflect downward when engaged by the plumbing fixture discharge;
      an outward flange extending from the outer, top surface of the upper portion, the outward flange of the sleeve being seated on the outer flange; and
      one or more sealing elements disposed about the lower portion of the sleeve, wherein the sealing element comprises a maximum outside diameter of the lower portion and is sized to directly engage an inside diameter of the waste drainpipe outlet.

2. The method according to claim 1, wherein the sleeve is integrally formed with the outer flange.

3. The method according to claim 1, further comprising removably connecting the sleeve to the outer flange.

4. The method according to claim 1, wherein providing the sleeve comprises forming the sleeve with a first material and wherein providing the outer flange comprises forming the outer flange with a second material.

5. The method according to claim 1, wherein providing the sleeve comprises forming the inwardly extending lip such that the inwardly extending lip has a first, unengaged position above the outer flange, and a second, engaged position substantially level with the outer flange.

6. The method according to claim 1, wherein providing the sleeve comprises forming the sleeve of the flexible material.

7. The method according to claim 1, wherein providing the sleeve comprises forming the one or more sealing elements on an end of the lower portion of the sleeve.

8. The method according to claim 1, wherein providing the sleeve comprises forming the one or more sealing elements such that the one or more sealing elements define a longitudinal distance, whereby the one or more sealing elements has a maximum diameter at its upper longitudinal end and generally decreases in diameter to its lower longitudinal end.

9. A method for manufacturing a flange apparatus for connecting between a plumbing fixture discharge and waste drainpipe outlet, comprising:
   providing an outer flange for seating against a surface disposed substantially between the plumbing fixture discharge and the waste drainpipe outlet; and
   providing a sleeve operable to be coupled to the outer flange, the sleeve including:
      a first end having a first longitudinal axis;
      a second end having a second longitudinal axis, the sleeve being unitarily formed of a flexible material such that the second end of the sleeve can be distorted relative to the first end of the sleeve, whereby the sleeve is capable of at least 10 degrees of deflection measured by the angular displacement of the second longitudinal axis relative to the first longitudinal axis while maintaining a cross-sectional shape of a lower portion of the sleeve;
      an inward lip extending from an outer, top surface of the first end, the lip being sufficiently flexible to deflect downward when engaged by the plumbing fixture discharge;
      an outward flange extending from the outer, top surface of the first end, the outward flange of the sleeve being seated on the outer flange; and
      one or more sealing elements disposed about the lower portion of the second end of the sleeve opposite the first end, wherein the sealing element comprises a maximum outside diameter of the lower portion and is sized to directly engage an inside diameter of the waste drainpipe outlet.

10. The method according to claim 9, wherein the sleeve is capable of deflection from 0 degrees to greater than 90 degrees measured by the angular displacement of the second longitudinal axis relative to the first longitudinal axis.

11. The method according to claim 9, wherein providing the sleeve comprises forming the sleeve of a unitary material having a hardness in the range of about 35 shore A to about 75 shore A.

12. The method according to claim 9, wherein providing the sleeve comprises forming the lower portion of the sleeve with a unitary material having a hardness in the range of about 75 shore A to about 120 Rockwell R.

13. The method according to claim 9, wherein providing the sleeve comprises forming one or more corrugated portions in the lower portion of the sleeve, the corrugated portions aiding flexibility of the lower portion of the sleeve.

14. The method according to claim 9, wherein providing the sleeve comprises forming the inwardly extending lip such that the inwardly extending lip has a first, unengaged position above the outer flange, and a second, engaged position substantially level with the outer flange.

15. The method according to claim 9, wherein providing the sleeve comprises forming the one or more sealing elements on an end of the lower portion of the sleeve.

16. The method according to claim 9, wherein providing the sleeve comprises forming the one or more sealing elements such that the one or more sealing elements define a longitudinal distance, whereby the one or more sealing elements has a maximum diameter at its upper longitudinal end and generally decreases in diameter to its lower longitudinal end.

17. A method for manufacturing an apparatus for connecting between a plumbing fixture discharge and waste drainpipe outlet, comprising:
   providing a sleeve unitarily formed of a flexible material such that the sleeve is capable of at least ten degrees of deflection while maintaining a cross-sectional shape of a lower portion of the sleeve, the sleeve having an upper portion, and the upper portion comprising:
      an inward lip extending from an outer, top surface of the upper portion, the lip being sufficiently flexible to deflect downward when engaged by the plumbing fixture discharge; and
      an outward flange extending from the outer, top surface of the upper portion, the flange being operable to be seated on a surface disposed between the plumbing fixture discharge and waste drainpipe outlet; and
   wherein the sleeve further comprises one or more sealing elements disposed about the lower portion of the sleeve, wherein the sealing element comprises a maximum outside diameter of the lower portion and is sized to directly engage an inside diameter of the waste drainpipe outlet.

18. The method according to claim 17, wherein providing the sleeve comprises forming one or more corrugated portions along the lower portion of the sleeve to impart flexibility to the sleeve.

19. The method according to claim 17, wherein the sleeve includes a first end having a first longitudinal axis and a second end having a second longitudinal axis, and wherein providing the sleeve comprises forming the sleeve with a flexible material such that the second end of the sleeve can be distorted relative to the first end of the sleeve, whereby the sleeve is capable of at least 10 degrees of deflection measured by the angular displacement of the second longitudinal axis relative to the first longitudinal axis.

* * * * *